(No Model.)
S. M. JONES.
COUPLING FOR PIPES OR RODS.
No. 528,168. Patented Oct. 30, 1894.
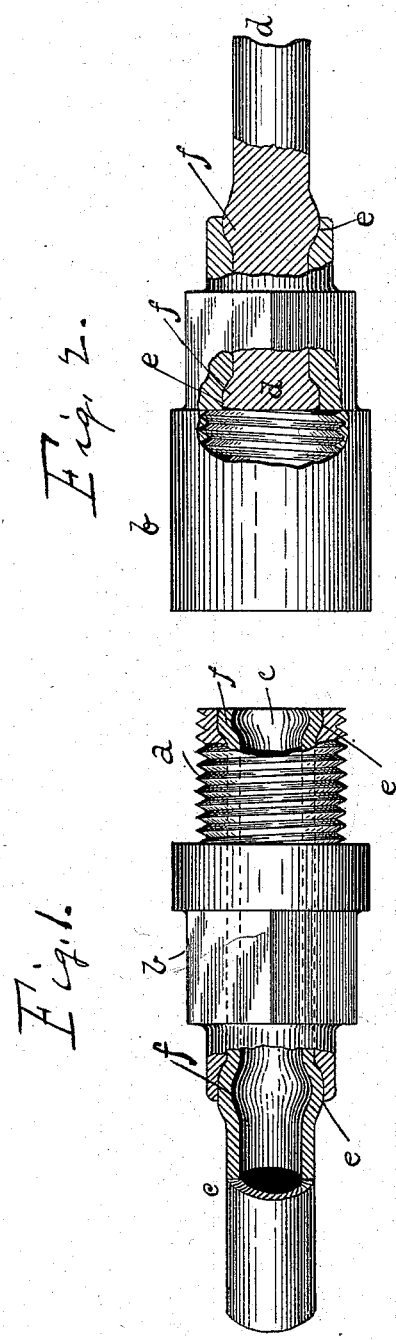
Witnesses.
David C. Watter
L. E. Brown
Inventor.
Samuel M. Jones,
By Nelson Hall
His Atty.

UNITED STATES PATENT OFFICE.

SAMUEL M. JONES, OF TOLEDO, OHIO.

COUPLING FOR PIPES OR RODS.

SPECIFICATION forming part of Letters Patent No. 528,168, dated October 30, 1894.

Application filed May 31, 1894. Serial No. 512,985. (No model.)

*To all whom it may concern:*

Be it known that I, SAMUEL M. JONES, a citizen of the United States, residing at Toledo, Lucas county, Ohio, have invented certain new and useful Improvements in Couplings for Pipes or Rods, of which the following is a specification.

My invention relates to that class of couplings for pipes or rods in which the meeting ends of the pipes or rods are provided with screw-threaded sleeves adapted to engage each other, the pipes or rods having been heretofore attached to their sleeves by screwing them into threaded sockets, in the sleeves, provided for that purpose. It has been found that the pipe or rod has been unduly weakened by thus cutting a thread on its end, and that where a pipe or rod so treated is subjected to unusual strain, breakage first occurs at the threaded part, and usually at the point where the rod enters the threaded socket of the sleeve.

My invention relates to and its object is to provide means for attaching pipes or rods to their coupling-sleeves whereby the objections above pointed out may be overcome, and whereby the rod or pipe may be reinforced and strengthened at the usual breaking point above referred to. I attain this object by means of the device hereinafter described, and shown and illustrated in the accompanying drawings, made part hereof, in which—

Figure 1, shows a pipe attached to its sleeve according to my invention, and Fig. 2, a rod attached to its sleeve according to my invention.

In the drawings the sleeve or "pin," $a$, is exteriorly threaded, and sleeve or "box," $b$, is interiorly threaded to receive the threaded portion of pin $a$, as shown. Each of the parts $a, b$, is bored axially to receive a pipe $c$ or rod $d$, these bores at each end being countersunk, as shown at $e$. Pipe $c$ or rod $d$ is inserted into the axial bore of pipes $a, b$, and are expanded, as at $f$, both at their meeting extremities and at the point where they enter their sleeves. This is accomplished by suitably heating the rod or pipe just before it is placed in the axial bore of the sleeve, and then subjecting the rod or pipe to a heavy longitudinal pressure or blow which expands or upsets the metal in the countersunk portions of the sleeve and the portions adjacent thereto not confined by the surrounding sleeve. The pipe or rod being thus enlarged and thickened at both ends of its sleeve is securely attached to the sleeve so that it cannot be withdrawn or pushed through, and the pipe or rod instead of being weakened by the cutting of a screw-thread at the point of junction between the pipe or rod and its sleeve, as heretofore, is strengthened by the access of metal as above described.

Having described my invention, what I claim, and desire to secure by Letters Patent, is—

A pipe or rod-coupling, comprising a pair of screw-threaded sleeves adapted to engage each other and having axial bores, in combination with pipes or rods in said bores and expanded portions on said pipes or rods at each end of each of said sleeves, substantially as shown and described, for the purpose specified.

SAMUEL M. JONES.

Witnesses:
O. L. FOSTER,
L. E. BROWN.